United States Patent [19]

Dowski, Jr.

[11] Patent Number: 5,227,890
[45] Date of Patent: Jul. 13, 1993

[54] AUTOMATIC FOCUSING DEVICE WHICH FOCUSES A LENS BASED ON A Z-TRANSFORMATION POLYNOMIAL

[75] Inventor: Edward R. Dowski, Jr., Portsmouth, R.I.

[73] Assignee: Konica Corporation, Tokyo, Japan

[21] Appl. No.: 786,031

[22] Filed: Oct. 31, 1991

[30] Foreign Application Priority Data

Nov. 5, 1990 [JP] Japan .................. 2-297357

[51] Int. Cl.$^5$ ............................................. H04N 5/232
[52] U.S. Cl. ......................................... 358/227; 354/402
[58] Field of Search ............... 358/209, 227; 354/400, 354/402, 408; 364/725; 250/201.2, 208.1, 201.7; 382/47

[56] References Cited

U.S. PATENT DOCUMENTS

| | | | |
|---|---|---|---|
| 4,814,889 | 3/1989 | Covey | 358/227 |
| 4,965,840 | 10/1990 | Subbarao | 382/1 |
| 5,016,110 | 5/1991 | Vuichard et al. | 358/227 |
| 5,061,953 | 10/1991 | Higashihara et al. | 354/402 |
| 5,065,246 | 11/1991 | Takemoto et al. | 358/227 |
| 5,105,278 | 4/1992 | Takemoto et al. | 358/227 |
| 5,148,209 | 9/1992 | Subbarao | 354/400 |

*Primary Examiner*—Michael T. Razavi
*Assistant Examiner*—Tuan V. Ho
*Attorney, Agent, or Firm*—Jordan B. Bierman

[57] ABSTRACT

The invention provides an apparatus for focusing an object through a lens on an image plane. The apparatus comprises a Z-transformation circuit for receiving a plurality of image data and for generating a Z-transformation polynomial in a given form by subjecting the plurality of image data to Z-transformation; a memory for storing a set of different focus-error distances each assigned a zero which is a value making a Z-transformation polynomial of a corresponding focus-error distance a zero point; calculation circuit for inputting the assigned zero of each of the different focus-error distances into the generated Z-transformation polynomial to select an optimum focus-error distance; and control circuit for moving the lens on the basis of the optimum focus-error distance.

12 Claims, 8 Drawing Sheets

AUTOMATIC FOCUSING DEVICE WHICH FOCUSES A LENS BASED ON A Z-TRANSFORMATION POLYNOMIAL

BACKGROUND OF THE INVENTION

The present invention relates to an automatic focusing device which automatically focuses the optical system of a still video camera, a silver halide film type of camera, binoculars and the like.

There are two kinds of systems in a conventional automatic focusing system, one is an active system in which a photographic object is irradiated with signal light such as auxiliary light, and the reflected signal is utilized, and the other is a passive system in which an image signal is utilized in some form.

In the passive system, the signal sent from a photographic object is utilized, and the obtained result is accurate, so that the passive system is widely used. In the case of a video camera, an image sensor (CCD) for the purpose of photographing is provided in the camera, so that automatic focusing can be conducted by utilizing an image signal obtained from the image sensor. A still video camera is provided with an image sensor in the same manner as the aforementioned movie video camera. Accordingly, when an image signal obtained from the image sensor is utilized, automatic focusing can be conducted accurately and advantageously without installing an optical system exclusively used for automatic focusing.

The conventional automatic focusing system used for a movie video camera in which an image signal is used for automatic focusing, is applied to a still video camera in the following manner.

The level of a high frequency component contained in an image signal becomes maximum at the best focusing position, and as a defocusing amount increases, the level of the high frequency component becomes low.

Figure 8A:
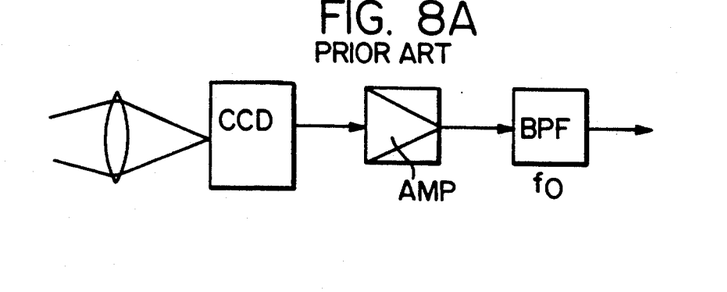
FIG. 8(A) is a view showing the composition of the hard ware of a conventional example.
Figure 8B:
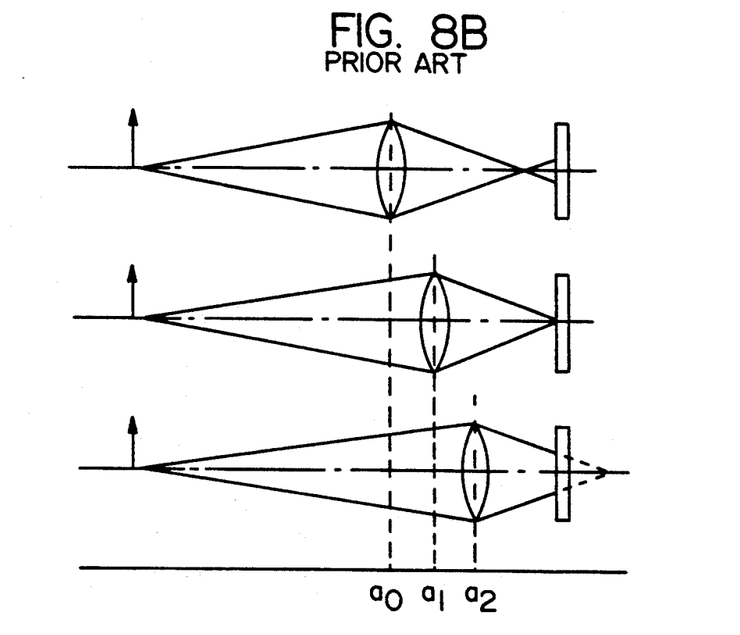
FIG. 8(B) is a view showing the scanning position of each picture-taking lens.
Figure 8C:
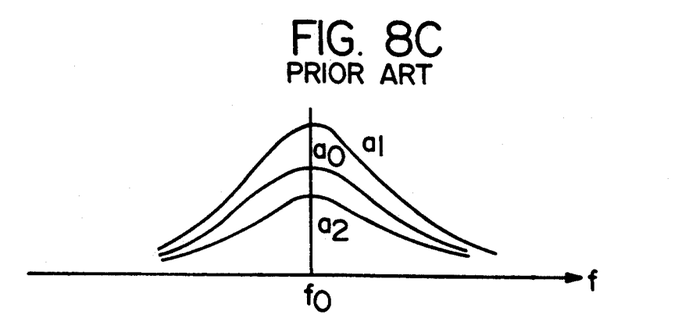
FIG. 8(C) is a view showing the level of a high frequency component in the aforementioned scanning position.

Utilizing the aforementioned phenomenon, the operation is conducted in such a manner that: at each time photographing is conducted, the scanning operation of a picture-taking lens is conducted from a very close position to an infinite position at a plurality of positions $a_0, a_1, a_2 \ldots$; high frequency component $f_0$ contained in the image signal is extracted by a band-pass filter during the scanning operation; levels of the high frequency components are successively compared so that the position where the level of the high frequency component becomes maximum can be found, for example position al is found; and the picture-taking lens is moved to position al. FIG. 8(A) shows the composition of hard ware of the aforementioned conventional example, FIG. 8(B) shows each scanning position of the picture-taking lens, and FIG. 8(C) shows the level of a high frequency component at each scanning position.

There are several problems in the aforementioned conventional automatic focusing system, and the problems will be described later.

In the case of the active system, it is necessary to provide an optical unit exclusively used for automatic focusing.

In the case of the passive system, the picture-taking lens must be moved from a very close position to an infinite position in order to find the best focus position, so that it takes a long time.

In order to improve detecting accuracy, the band width of the band-pass filter may be made narrow. When it is made too narrow, the frequency component is hardly contained in the narrow band depending on a photographic object, so that output of sufficient intensity can not be obtained.

SUMMARY OF THE INVENTION

The present invention has been achieved in order to solve the aforementioned conventional problems. It is a primary object of the present invention to provide a new type of automatic focusing device characterized in that: wherever the picture-taking lens may be located, focusing can be achieved only when processing is conducted twice by taking-in an image signal and the picture-taking lens is moved once or twice; focusing can be conducted without any relation to the frequency component of the signal of the photographic object; and it is not necessary to provide an optical system exclusively used for automatic focusing.

Figure 1:
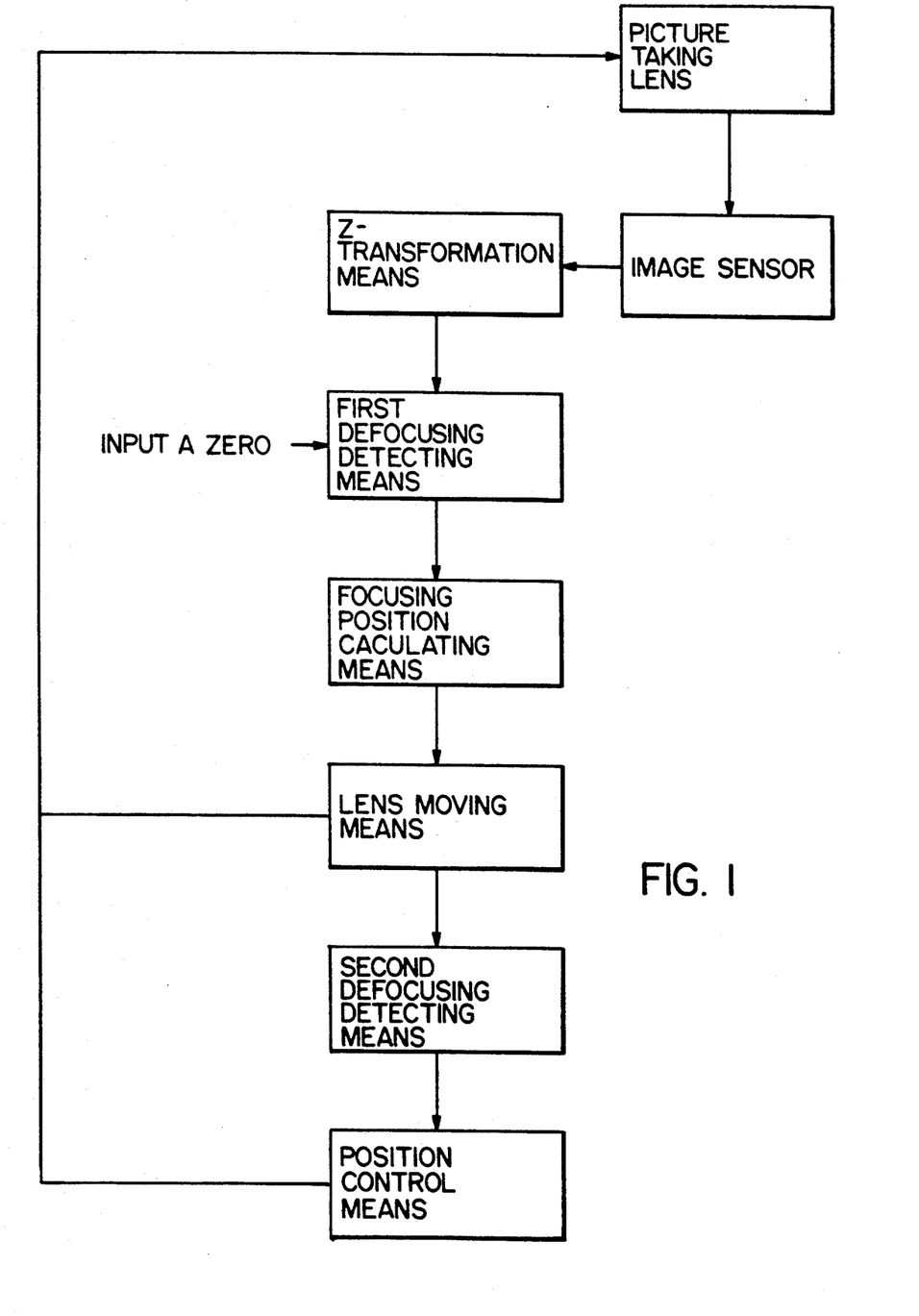
FIG. 1 is a block diagram showing the structure and function of the present invention.

As shown in FIG. 1, in order to accomplish the aforementioned object, the automatic focusing device of the camera according to the present invention comprises: a Z-transformation means which conducts a Z-transformation on image signal data sampled from an image sensor when the picture-taking lens is located in an arbitrary position; first defocusing amount detecting means which detects the present defocusing amount or a focus error distance by finding the zero point of a polynomial in such a manner that each of predetermined zeros corresponding to a plurality of defocusing amounts is substituted for a variable of the polynomial on which Z-transformation has been conducted; an automatic focusing position calculating means which calculates at least one of automatic focusing positions of the far side of the image sensor of the picture-taking lens and the near side of the image sensor, according to the detected defocusing amount; a moving means which moves the picture-taking lens or image sensor in a direction toward to one of the automatic focusing positions within a range not exceeding the automatic focusing position; second defocusing amount detecting means for detecting a new defocusing amount at a new lens position; and a position control means which positions the picture taking lens or image sensor in the automatic focusing position according to a correct relative focusing position that has been found in accordance with the new defocusing amount after movement or a change between the new and previous defocusing amounts.

For example, the aforementioned moving means moves the picture-taking lens or image sensor to one of the focusing points which has been calculated by the focusing position calculating means. When the new defocusing amount is approximately zero after the picture-taking lens or image sensor has been moved, the position control means judges that it has been moved to a correct focusing position, and the picture-taking lens or image sensor is fixed to the position. When the new defocusing amount is not approximately zero, the picture-taking lens or image sensor is moved to another focusing position.

Another moving system can be described as follows. The aforementioned moving means moves the picture-taking lens or image sensor in the direction of one focusing position which has been calculated by the focusing position calculating means. When the new defocusing amount after movement of the picture-taking lens or image sensor is decreased as compared with the defocusing amount before movement, it is judged that the focusing position located in the direction of the movement is correct, and the picture-taking lens or image sensor is moved to the focusing position. When the new defocusing amount is increased, it is judged that the focusing position located in the direction opposite to the movement is correct, and the picture-taking lens or image sensor is moved to the focusing position.

One dimensional Z-transformation or two dimensional Z-transformation is conducted on sampled data of the image signal outputted from the image sensor.

The first defocusing amount detecting means detects the present defocusing amount in such a manner that: when a predetermined set of zeros in a plurality of Z-transformation polynomial in which defocusing amounts are different, are successively substituted for a variable of the aforementioned Z-transformed polynomial, the zero point of the sampling data in the Z-transformation polynomial is found, and the present defocusing amount is detected according to the found zero point.

The focusing position calculating means calculates at least one of the focusing points, one is located on the far side of the image sensor and the other is located on the near side, according to the detected defocusing amount. One of the defocusing points is the correct focusing point.

The moving means moves the picture-taking lens or image sensor in the direction of one of the aforementioned calculated focusing positions within a range not exceeding the focusing position.

The second defocusing means detects the new defocusing amount at the position of the picture-taking lens or image sensor which has been moved by the aforementioned moving means.

The position control means positions the picture-taking lens or image sensor at the focusing position, finding the correct focusing point according to the change of defocusing amount between before and after the aforementioned movement or the defocusing amount after the focusing movement.

For example, when the aforementioned moving means moves the picture-taking lens to the focusing position which has been found by means of calculation, the new defocusing amount after the movement becomes approximately zero if the focusing position is correct. Due to the foregoing, it can be known that the focusing point is correct, so that the picture-taking lens is set in the position. In the case where the new defocusing amount is not approximately zero, it can be judged that the focusing point is not correct, so that the image-taking lens or image sensor is moved and set to another focusing position, which is the correct focusing position. In this case, when only one of the focusing positions is calculated by the aforementioned focusing position calculating means, another focusing position, the correct one, is calculated. Another focusing position is calculated, using the defocusing amount before the movement of the lens or the defocusing amount after the movement of the lens.

When the picture-taking lens or image sensor is moved in a direction so that it can approach one of the focusing positions, the new defocusing amount decreases if the focusing position is correct, and it increases if the focusing position is not correct. Consequently, when the new defocusing amount is compared with that before the movement of the lens, it can be judged whether the focusing position is correct or not. When it is correct, the picture-taking lens is moved in the same direction so that it can be positioned, and when it is not correct, the picture-taking lens is moved in the opposite direction so that it can be set to another focusing position, which is the correct one. The correct focusing point is previously found by the focusing position calculating means in the same manner as described above, or it is found by conducting a new calculation.

In the abovementioned embodiment, an initial defocusing amount is detected when the lens is located at an arbitrary position. However, of course, it is possible to detect a defocusing amount after the lens has been located at an infinite position or a very close position. In this embodiment, the position control means can obtain a correct focusing position by moving the lens in a direction toward to the opposite position such as the very close position or the infinite position without detecting a new focusing amount.

DETAILED DESCRIPTION OF THE PREFERRED EMBODIMENT

Figure 2A:
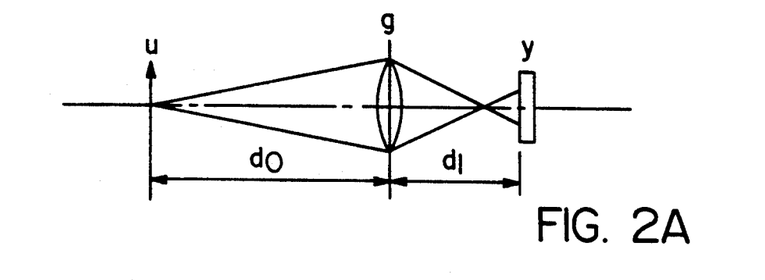
FIG. 2(A) and FIG. 2(B) are views to show the positional relation of each portion, which is used to explain the theory of the present invention.
Figure 2B:
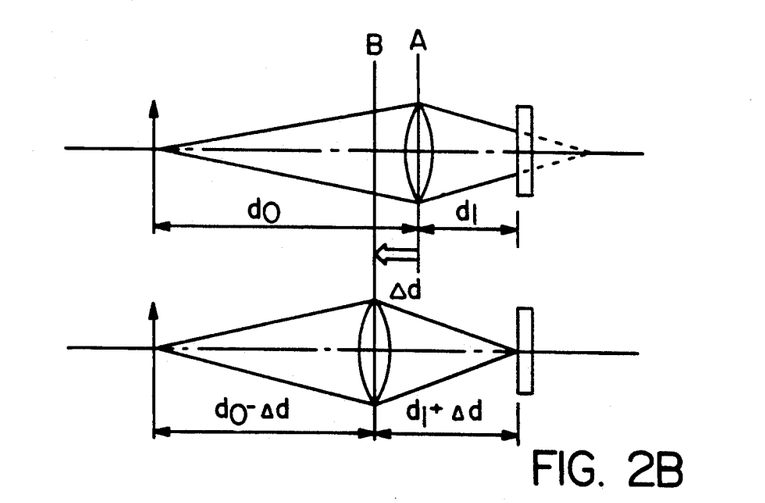
Figure 3:
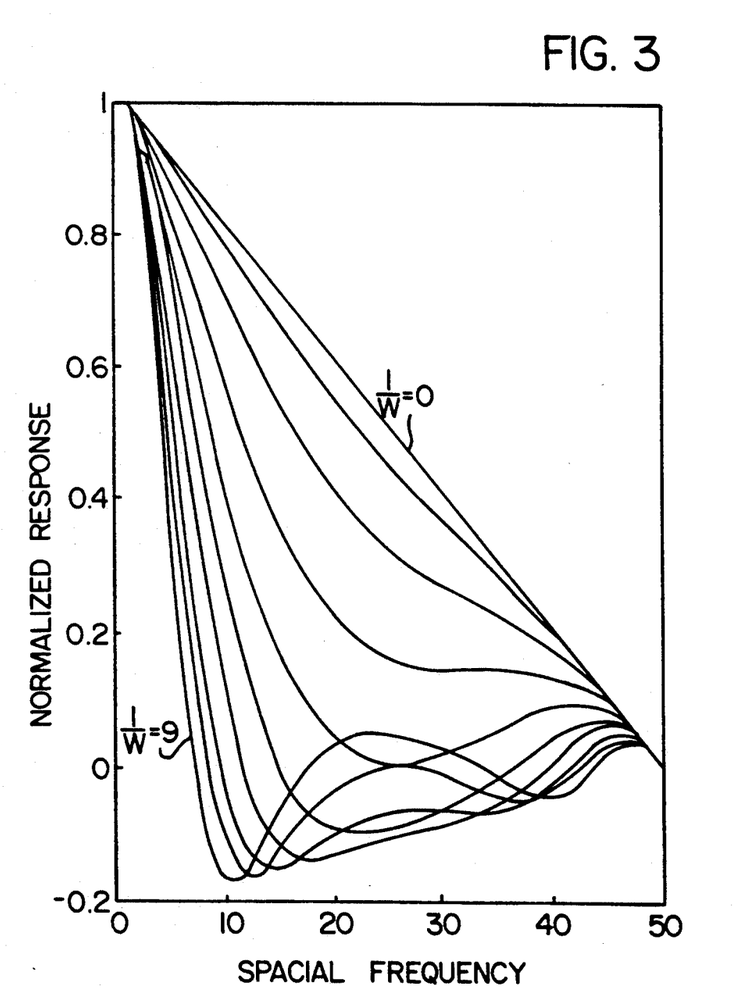
FIG. 3 is a diagram showing characteristics of OTF in which defocusing amount is different.

Referring now to FIG. 2 and FIG. 3, the theory relating to the present invention will be explained previous to the explanation of the embodiment.

In an image pickup optical system, data y of an image signal which has been sampled by an image sensor such as a CCD, can be generally expressed as follows [Refer to FIG. 2(A).]

$$y = u*g + n \qquad (1)$$

where g is the point spread function of a lens, u is object data, and n is a noise which occurs in an image sensor system.

In equation (1), all variables are of two dimensions, and mark * represents a convolution.

According to the optical theory, point spread function g is given by the following equation:

$$g = |FT[h(W) \times P]|^2 \ldots \qquad (2)$$

where FT is a Fourier transformation operator.

$$h(W) = \exp\left[j \cdot \frac{K}{2W}(X^2 + Y^2)\right]$$

P: Lens window function

Suppose that $d_0$ is the distance between a photographic object and a picture-taking lens, and $d_1$ is the distance between the picture-taking lens and an image sensor. When $d_1$ is defocused on the side of a distance smaller than the distance in which the in-focus state can be obtained, the aforementioned W is set so that it can satisfy the following equation.

$$1/W = 1/d_0 + 1/d_1 - 1/f \quad (3)$$

When $d_1$ is defocused on the side of a distance larger than the distance in which the in-focus state can be obtained, the aforementioned W is set so that it can satisfy the following equation.

$$-1/W = 1/d_0 + 1/d_1 - 1/f \quad (3)'$$

Lens window function P shows the lens aperture. When there is no aberration in the picture-taking lens, lens window function P is constant at any points in the lens aperture, and lens window function P is 0 at the point outside the lens aperture.

In order to simplify the explanation, term n which denotes a noise is neglected, and then the following equation can be obtained.

$$y = u*g \quad \ldots (1)$$

Accordingly, it can be understood that point spread function g deteriorates the image with convolution. According to equation (2), it is clear that point spread function g is affected only by W. In equations (3) and (3)', distance $d_1$ between the picture-taking lens and image sensor, and focal distance or focal length f of the picture-taking lens, are already known, so that point spread function g can be determined if distance $d_0$ between the photographic object and the picture-taking lens is determined.

From other viewpoint, it can be said: when point spread function g can be identified at the present picture-taking lens position, distance $d_0$ between the photographic object and the picture-taking lens can be found.

Suppose that the picture-taking lens is located in an infinitely far focus position A to focus an object at an infinitely far position when sampling is conducted on image signal data as shown in FIG. 2(B). Since distance $d_1$ between the picture-taking lens and the image sensor is already known, the following equation is established when distance $d_0$ between the photographic object and the picture-taking lens is found.

$$1/(d_0 - \Delta d) + 1/(d_1 + \Delta d) = 1/f \quad (4)$$

Due to the foregoing, lens movement $\Delta d$ can be found to obtain the focusing position (which is shown by B in the drawing).

Next, the method will be explained by which point spread function g in the present lens position can be identified.

First, one dimensional discrete Fourier transformation of point spread function g is given by the following equation, wherein $G_K$ is called an optical transfer function and its acronym is OTF. Its function in an optical system is similar to that of a transfer function in an electrical transmitting path such as an amplifier.

$$\begin{aligned} G_K &= \sum_{i=0}^{M-1} g_i \cdot \exp\{-j(2\pi/M)ki\} \\ &= g_0 + g_1 \exp\{-j(2\pi/M)k\} + \\ &\quad g_2 \exp\{-j(2\pi/M)2k\} + \ldots + \\ &\quad g_{M-1} \exp\{-j(2\pi/M)(M-1)k\} \end{aligned} \quad (5)$$

where $g_i$ (i = 0, 1, ... M-1) is a sampled value of point spread function g, and M is the number of samples.

Curves of OTF $G_K$ are shown in FIG. 3, wherein frequency component k ($k \geq 0$) is a variable expressed on the horizontal axis, and the curves are drawn with regard to various defocusing amount 1/W. According to equation (3), when 1/W = 0, the following equation is satisfied: $1/d_0 + 1/d_1 = 1/f$. Accordingly, it can be known that the lens in a focusing position.

When it is set that $Z = \exp\{-j(2\pi/M)k\}$ in equation (5), ($|Z| = 1$). Then, the following equation is established.

$$G_K = g_0 + g_1 z^{-1} + g_2 Z^{-2} + \ldots + g_{M-1} z^{-(M-1)} \quad (6)$$

As shown in equation (6), one dimensional discrete Fourier Transformation is expressed in the form of a polynomial of $Z^{-1}$. Accordingly, when factorization is conducted, $G_K$ can be represented as follows.

$$\begin{aligned} G_K = g_{M-1}(Z^{-1} - Z_1)(Z^{-1} - Z_2) \ldots \\ (Z^{-1} - Z_{M-1}) \end{aligned} \quad (7)$$

where $Z_i$ (i = 1, 2, ..., M-1)

is a zero point of a polynomial in which $Z^{-1}$ is used as a variable. That is, when $Z^{-1} = Z_i$ (or $Z = 1/Z_i$), $G_K = 0$. When the zero point of $G_K$ at a certain defocusing amount 1/W is substituted for $Z^{-1}$ of $G_K$ at another defocusing amount 1/W, $G_K$ does not become 0. Accordingly, suppose that: the zero point of $G_K$ with regard to various defocusing mount 1/W is previously investigated; and when the zero point of $G_{K0}$ with regard to a certain defocusing amount $1/W_O$ is substituted for $Z^{-1}$ of $G_K$, the defocusing amount 1/W of which is not known, $G_K = 0$. Then, it is found that defocusing amount 1/W of OTF $G_K$ is $1/W_0$. In other words, $G_K$ can be identified. However, in the case of a curve in FIG. 3, the defocusing amount 1/W of which is smaller than a certain value, $G_K$ does not become 0. In other words, there is no zero point which satisfies $|Z_i| = 1$. Consequently, in the case described above, $G_K$ can not be identified by one dimensional discrete Fourier Transformation.

In order to identify and evaluate OTF even in the aforementioned case, $\exp\{j(2\pi/M)k\}$ in equation (5) is replaced with $Z = \gamma \exp(j\omega)$ having amplitude $\gamma$, and one dimensional Z-transformation of point spread function g is found as follows.

$$\begin{aligned} G(Z) &= \sum_{i=0}^{M-1} g_i Z^{-i} \\ &= g_0 + g_1 Z^{-1} + g_2 Z^{-2} + \ldots + g_{M-1} Z^{-(M-1)} \end{aligned} \quad (8)$$

Due to the aforementioned polynomial G(Z), G(Z) can be evaluated at all points, not limited to the circumference of a unit circle of r=1 on the complex surface.

Z-transformation is conducted on both sides of equation (1), and the equation can be represented as follows.

$$Y(Z) = U(Z) \times G(Z) + N(Z) \qquad (9)$$

In the above-described equation, Y(Z), U(Z), G(Z) and N(Z) respectively represent Z-transformation amount of y, u, g and n in equation (1). On the assumption that N(Z), which is a noise term, is neglected, $Y(Z)=0$ when $Z_i$ is the zero point of U(Z) or G(Z). Suppose that: when the zero point of $G_0(Z)$ which has been obtained by conducting Z-transformation on point spread function g corresponding to a certain defocusing amount $1/W_0$, is substituted for Y(Z), the result of $Y(Z)=0$ is obtained. Then, G(Z) at that time can be identified to be $G_0(Z)$. (In general, the zero point of G(Z) does not agree with U(Z) which is a Z-transformation value of sampling data.)

Therefore, calculation is conducted as follows: point spread function g with regard to the different defocusing amount 1/W is previously found in the case of a picture-taking lens of a camera to be utilized; OTF $G_K$ ($G_{K1}, G_{K2}, \ldots G_{KJ}$) corresponding to each defocusing amount 1/W is found from each point spread function g by means of measurement or theoretical calculation; and further a zero point set ($Z_{on1}, Z_{on2}, \ldots, Z_{oni}$; n=1, 2,..., J) in each OTF $G_K$ is found by means of calculation.

The zero point set of each OTF $G_K$ is substituted for Y(Z) which has been found by conducting Z-transformation on sample data of image sensor output, and when OTF is so found that the total of these absolute values become minimum, the found OTF corresponds to the value of present OTF.

In the manner described above, OTF can be identified, so that point spread function g can be also identified. Consequently, defocusing amount 1/W is determined, and movement amount $\Delta d$ can be determined.

Processing according to one dimensional Z-transformation has been explained above. Processing according to two dimensional Z-transformation will be described below.

Suppose that two dimensional Z-transformation according to equation (1) is represented as follows.

$$Y(Zr, Zc) = U(Zr, Zc) \times G(Zr, Zc) + N(Zr, Zc) \qquad (10)$$

In the above-described equation, Y(Zr, Zc), U(Zr, Zc), G(Zr, Zc) and N(Zr, Zc) are the results of two dimensional Z-transformation of y, u and n in equation (1). Subscript r and c which are affixed to Z represent a row and a column.

Then, equation (10) can be represented as follows.

$$\Sigma_n \Sigma_m y_{mn} \cdot Zr^{-m} \cdot Zc^{-n} = U(Zr \cdot Zc) \times \Sigma_n \Sigma_m g_{mn} \cdot Zr^{-m} \cdot Zc^{-n} + \Sigma_n \Sigma_m n_{mn} \cdot Zr^{-m} \cdot Zc^{-n} \qquad (11)$$

where $y_{mn}$, $g_{mn}$ and $n_{mn}$ respectively represent output data of the image sensor 2A, the point spread function, and data of the m-th row and n-th column in the two dimensional sample data matrix of noise data.

When there is no correlation between rows in two dimensional Fourier Transformation, the following equation is established generally.

$$H(Zr, Zc) = H(Zr) \times H(Zc)$$

Consequently, in the case of noise in which there is no correlation between rows, the term of noise on the right side is represented as follows.

$$\Sigma_m \Sigma_n n_{mn} \cdot Zr^{-m} \cdot Zc^{-n} = \Sigma_n n_m \cdot Zr^{-m} \times \Sigma_n n_n \cdot Zc^{-n} \qquad (12)$$

That is, the term of noise can be represented by the form of multiplication of one dimensional Z-transformation. Suppose that the zero point of the one dimensional Z-transformation polynomial of noise is represented by $Z_{RCN}$ {in general, $Z_{RON}$ is a complex number, and $Z_{RON} = \gamma_{RON} \exp(j\omega_{RON})$}, and then $Z_{RCN}$ is substituted for one of the variables Zr and the following equation can be obtained.

$$\Sigma_m \Sigma_n n_{mn} \cdot Z_{RON}^{-m} \cdot Zc^{-n} = \Sigma_m n_m \cdot Z_{RON}^{-m} \times \Sigma_n n_n \cdot Zc^{-n} = 0$$

When the zero point $Z_{RON}$ of the same polynomial of noise is substituted for equation (10), the noise term on the right side of equation (10) becomes 0, so that the equation can be represented as follows.

$$\Sigma_m \Sigma_n y_{mn} \cdot Z_{RON}^{-m} \cdot Zc^{-n} = U(Z_{ROM} \cdot Zc) \times \Sigma \Sigma g_{mn} \cdot Zr^{-m} \cdot Zc^{-n} \qquad (13)$$

Zero point $Z_{RON}$ is a constant, and as shown in FIG. 13, the left side is represented in the form of the sum of the one dimensional Z-transformation equation of y, and the second term on the right side is represented in the form of the sum of the one dimensional Z-transformation equation of g. That is, the zero points of the one dimensional Z-transformation polynomial of g on the right side can be the zero points of the one dimensional Z-transformation polynomial of y on the left side.

As described above, when one of the two variables Zr, Zc of the two dimensional Z-transformation polynomial is fixed by substituting the zero point of noise, the noise component is cancelled and the two dimensional processing becomes equivalent to the one dimensional processing, so that the zero points of the one dimensional Z-transformation polynomial can be utilized as they are.

That is, as compared with the case of pure one dimensional processing, in the case of the two dimensional processing, noise can be effectively cancelled and a focusing operation can be achieved more accurately by utilizing the zero point of noise.

Suppose that the picture-taking lens is initially located in an infinitely far position, which is shown by A in FIG. 2(B). Since $d_1$ is defocused at a position on the smaller side with regard to the focusing point, equation (3) is utilized. Therefore, the picture-taking lens may be moved by distance $\Delta d$ so that it can be separated from the image sensor. In the case where the picture-taking lens is initially located in a very close focus position to focus the closest object, the adjustment is conducted in the same manner. That is, since $d_1$ is defocused in a position on the larger side with regard to the focusing point, equation (3)' is used. Therefore, the picture-taking lens may be moved by distance $\Delta d$ so that it can approach the image sensor.

That is, the aforementioned method is advantageous in that: focusing can be completed by one operation of the picture-taking lens. However, it is necessary to initially set the picture-taking lens in the infinitely far position or the very close position each time photographing is conducted, so that electric power consumption increases and high speed continuous photographing is restricted.

In order to solve the aforementioned problems, the following focusing method is considered: even when the picture-taking lens is located at an arbitrary position (specifically, in a position where the previous photographing was completed), focusing is conducted without adjusting the picture-taking lens to the infinitely far position or the very close position.

When the picture-taking lense is located at an arbitrary position, the defocusing amount can be found by the aforementioned calculation. However, it can not be judged whether $d_1$ is defocused on the large distance side or on the small distance side. In other words, it can not be judged which of equation (3) and (3)' should be used.

Therefore, in the present invention, the operation is conducted as follows. For example, equation (3) is utilized, and lens moving amount $\Delta d_a$ is found by which the picture-taking lens is moved so that the focusing position can be obtained. Then, the picture-taking lens is moved by the distance $\Delta d_{ao}$, which is smaller than $\Delta d_a$, in the direction determined by the utilized equation (in this case, in the direction on the far side of the image sensor), and the defocusing amount is detected at the position. In this case, when the defocusing amount is decreased as compared with that before the picture-taking lens was moved, it can be judged that the lens movement amount $\Delta d_a$ found by equation (3) corresponding to the focusing position is correct, and then the picture-taking lens is focused when it is moved from the present position in the aforementioned moving direction by distance $(\Delta d_a - \Delta d_{ao})$.

In the case where the defocusing amount is increased as compared with the defocusing amount before the picture-taking lens is moved, it is judged that lens movement amount $\Delta d_a$ found by equation (3) is not correct. Therefore, the defocusing amount before movement or that after movement is substituted for equation (3)' so that lens movement amount $\Delta d_b$ or $\Delta d_b'$ can be found, and then the picture-taking lens is moved in the direction reverse to the aforementioned direction by the distance $(\Delta d_{ao} + |\Delta d_b|)$ or $|\Delta d_b'|$ so that the picture-taking lens can be focused.

In the case where the initial lens movement amount $\Delta d_{ao}$ is made equal to the lens movement amount $\Delta d_a$, of the assumed focus position is correct, it is not necessary to move the picture-taking lens any more since it has already been focused in its position. In this case, whether the focusing position is correct or not may be judged by the increase and decrease in the defocusing amount in the same manner as described above. When the picture-taking lens is moved to the focusing position, the defocusing amount becomes approximately zero. Therefore, whether the picture-taking lens is focused or not, can also be judged by the defocusing amount.

Referring now to the drawings, embodiments of the focusing control device of a camera according to the present invention will be explained as follows.

Figure 4A:
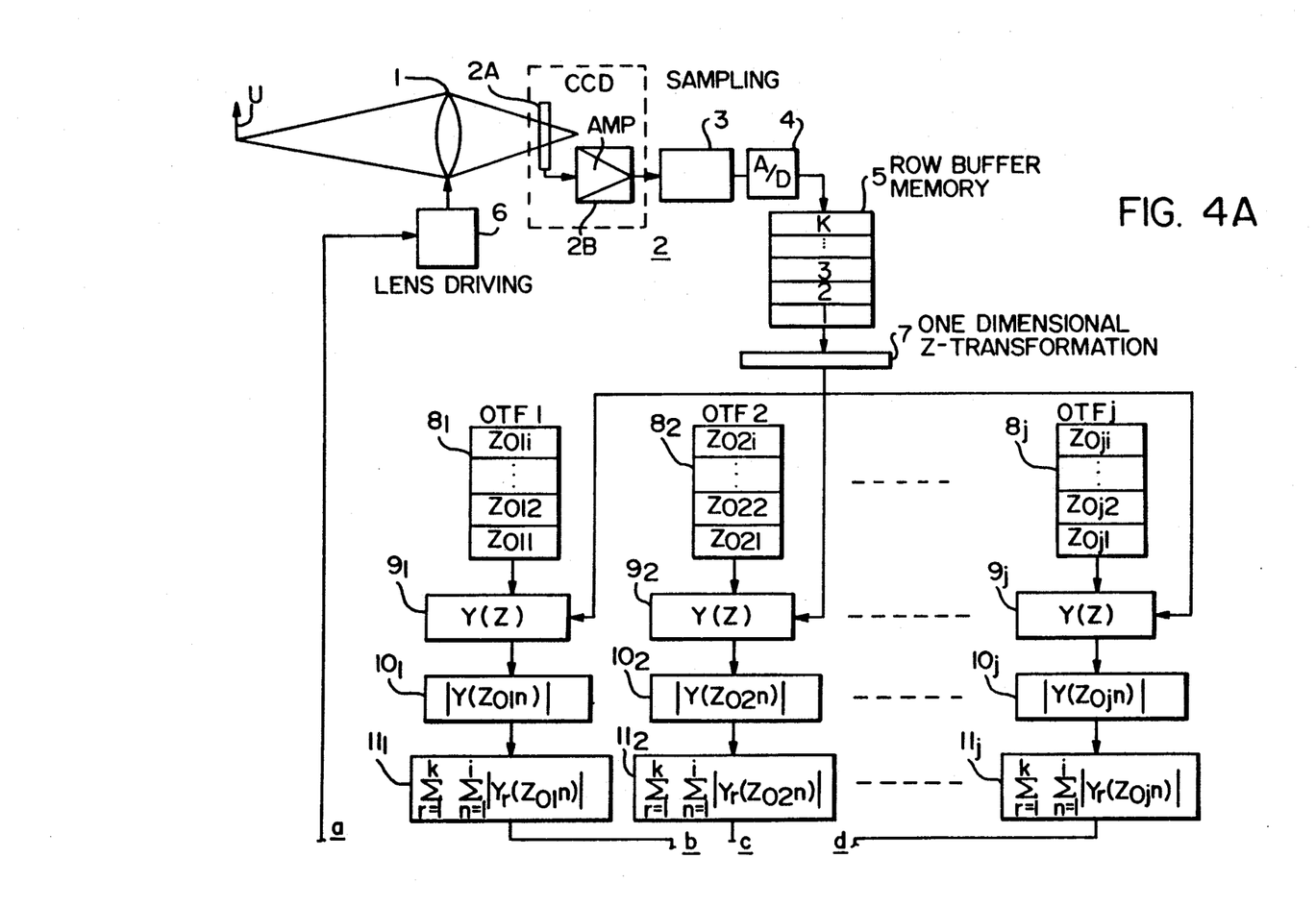
FIG. 4(A) and FIG. 4(B) are views showing the composition of the first embodiment of the present invention.
Figure 4B:
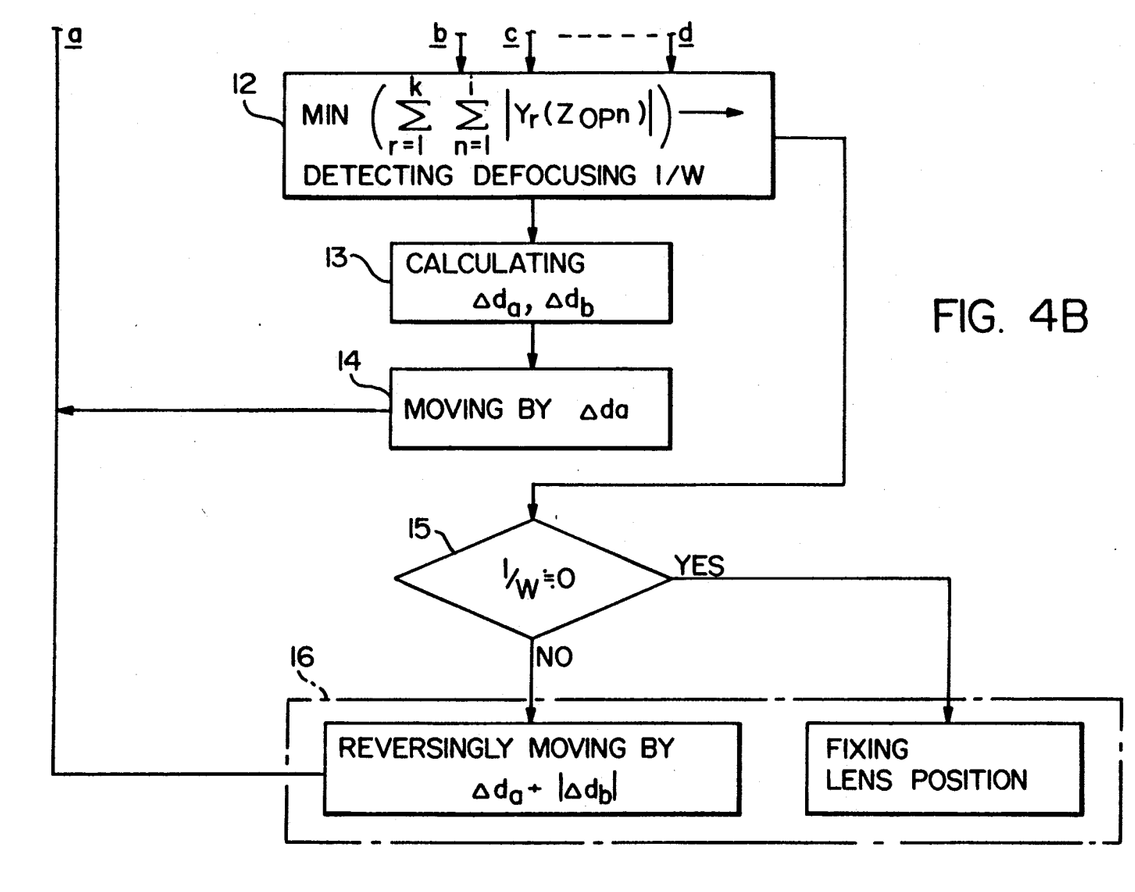

In FIG. 4 which shows the structure of the first embodiment, a picture-taking lens 1 is set in an arbitrary position (in general, in the position where the previous photographing was completed), when automatic focusing operation is started. Light which has passed through the picture-taking lens 1, is photoelectrically transferred into an image signal and amplified by an image sensor circuit 2 including a CCD (an image sensor) 2A and a signal amplifier 2B, and the obtained image signal is outputted.

The aforementioned image signal is sampled by a sampling circuit 3 so that the data of pixels necessary for automatic focusing can be obtained, wherein the data corresponds to an image portion to be focused. Then, the image signal is converted into a digital signal by an A/D-converter 4. After that, the data of K rows in one dimensional direction with regard to the image surface, wherein one row includes n pieces of data, is temporarily stored in a row buffer memory 5.

On the other hand, the zero point sets ($Z_{op1}$, $Z_{op2}$ ..., $Z_{opi}$; $p = 1, 2, \ldots, J$) of OTF $G_K$ with regard to different defocusing amount $1/W$, the number (J) of which is plural, are respectively stored by registers $8_1 \sim 8_j$, the number of which is J.

Arithmetic processing executed in each arithmetic section of a micro-computer will be successively explained as follows.

In one dimensional Z-transformation section 7, sample image data $y_{11} \sim y_{1n}$ of the first row which are held in the buffer memory 5, are Z-transformed so as to find $Y_1(Z)$ composed of a polynomial of $Z^{-1}$ as follows. This one dimensional Z-transformation section 7 corresponds to a Z-transformation means.

$$Y(Z) = Y_{11} + Y_{12}Z^{-1} + Y_{13}Z^{-2} + \ldots + Y_{1n}Z^{-n}$$

In zero point substitution section $9_1 \sim 9_i$ corresponding to registers $8_1 \sim 8_i$, zero points $Z_{0pi} \sim Z_{0pi}$ of zero point sets stored in register $8_p$ which corresponds to $Y_1(Z)$ inputted from the one dimensional transformation section 7, are successively stored. In absolute value arithmetic section $10_1 \sim 10_j$, $|Y_1(Z_{0p1})| \sim |Y_1(Z_{0pi})|$ which are the absolute values of the aforementioned substituted values are found.

Absolute values $|Y_1(Z_{0pl})| \sim |Y_1(Z_{0pi})|$ found in the aforementioned manner are successively inputted into corresponding adding section $11_p$ ($p = 1 \sim j$) so as to be added. After the aforementioned arithmetic processing has been completed with regard to all zero points of one set, the same arithmetic processing is repeated with regard to the sample image data of the second row, and the result of the operation is added to the addition value of the first row in an addition section 11p.

After the aforementioned arithmetic processing has been completed with regard to the K-th row, value $$\sum_{r=1}^{k} \sum_{n=1}^{i} |Y_r(Z_{0pn})|$$

accumulated in the adding section 11p is compared in a comparing section 12, and OTF corresponding to the minimum value is identified as OTF corresponding to the present defocusing amount $1/W$. In this case, the zero point substituting section $9_1 \sim 9_i$, the absolute value calculating section $10_1 \sim 10_i$, the adding section $11_1 \sim 11_i$, and the comparing section 12, correspond to the defocusing amount detecting means.

In the manner described above, the present defocusing amount $1/W$ is detected. Then, in the focusing position calculating section 13, lens movement amount $\Delta d$, which represents the focusing position, is calculated. As described above, the picture-taking lens 1 is set at an arbitrary position, so that it can not be judged whether $d_1$ is defocused on the side of longer distance or on the side of shorter distance. Accordingly, in this embodiment, the lens movement amount is found in such a manner that: utilizing equations (3) and (3)', distances $d_0$ (which has been found by equation (3)) and $d_0'$ (which has been found by equation (3)') between the photographic object U and the picture-taking lens, are found; and these values are substituted for equation (4) so that lens movement amount $\Delta d_a$, $\Delta d_b$ corresponding to each focusing position can be found.

When the direction in which $d_1$ is increased, is defined as positive, both roots obtained by substituting $d_0$ for equation (4) become positive. However, the smaller one is selected for $\Delta d_a$. The roots obtained when $d_0'$ is substituted for equation (4), are a positive and negative value. The negative one is selected for $\Delta d_b$. This focusing position calculating section 13 corresponds to a focusing position calculating means.

For example, in the case of lens movement amount $\Delta d_a$, which is one of lens movement amount $\Delta d_a$ and $\Delta d_b$ obtained in the aforementioned manner, the lens moving section 14 moves the picture-taking lens 1 by the distance $\Delta d_a$ so that the picture-taking lens 1 can be separated from CCD2A. These lens moving section 14 and drive circuit 6 correspond to a moving means.

When the picture-taking lens 1 is located in the aforementioned position, new data sent from CCD2A is sampled, and Z-transformation and zero point substitution are conducted in the same manner as described above, and then defocusing amount 1/W is detected. Consequently, the zero point substituting section $9_1 \sim 9_i$, the absolute value calculating section $10_1 \sim 10_i$, the adding section $11_1 \sim 11_i$, and the comparing section 12 correspond to the second defocusing amount detecting means.

The judging section 15 judges whether the detected defocusing amount 1/W is approximately zero within the range of allowable errors or not.

When the defocusing amount 1/W is judged to be approximately zero after the picture-taking lens has been moved, the control section 16 judges that the focusing position is correct, and the picture-taking lens is fixed in the position so that the automatic focusing operation is completed.

When the defocusing amount 1/W is not approximately zero, it is judged that the focusing position is not correct and the other focusing position is correct. Then, the lens drive circuit 6 is driven so that the picture-taking lens 1 can be approached to CCD2A by the distance of $\Delta d_a + |\Delta d_b|$, and the picture-taking lens is set in a focusing position which is moved from the original lens position to the side of CCD2A by the distance of $|\Delta d_b|$. The aforementioned judgment section 15 and the control section 16 correspond to a position control means.

In the aforementioned embodiment, when the defocusing amount 1/W is detected, OTF is so selected that the total (which is equivalent to the average) of $|Y_r(Z_{0pn})|$ of each row can become minimum. However, OTF may be selected which has the minimum value among all values of $|Y_r(Z_{0pn})|$.

In the aforementioned embodiment, sampling data of a plurality of rows (groups) is used. Accordingly, the influence of noise can be averaged and reduced. When the influence of noise is not so much, it is possible to process only by the data of one row. When a sequence is established by which data is accumulated on each term $Z^{-n}$ of the polynomial each time one piece of datum is sampled one by one, a temporarily storing means such as the buffer memory 5 is not necessary. In the above-described system, the arithmetic process is expanded, so that this system is suitable for an apparatus provided with high speed processing function.

Figures 5, 6:
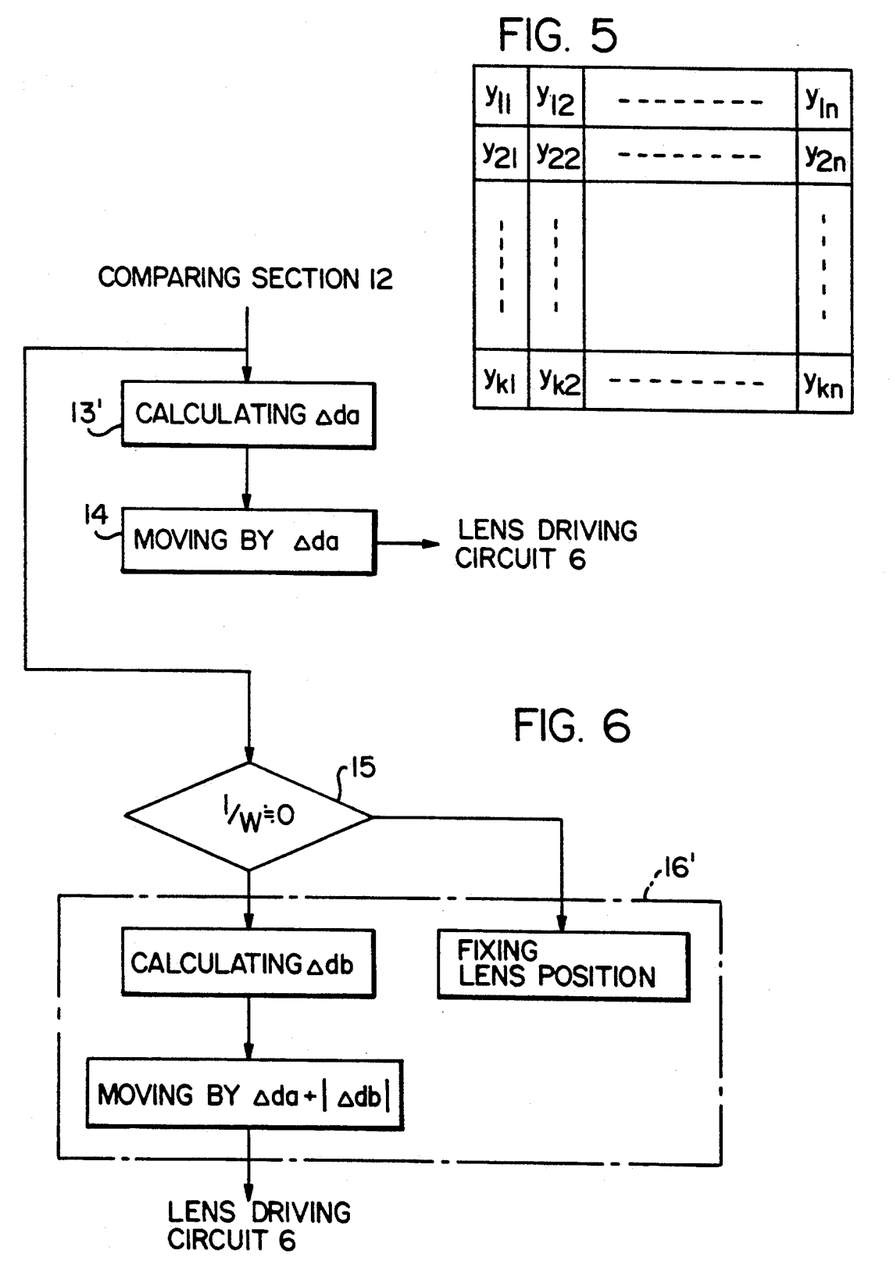
FIG. 5 is an illustration showing the position of data to be sampled.
FIG. 6 is a view showing the composition of the second embodiment of the present invention.

Referring now to FIG. 6, a variation of the aforementioned embodiment will be explained. Elements 1~12 are common between FIG. 4 and FIG. 6, so that the explanation will be omitted.

In this embodiment, the focusing position calculating section 13' calculates only the lens movement amount $\Delta d$ corresponding to one focusing position, for example, it calculates only $\Delta d_a$, utilizing equation (3). The picture-taking lens moving section 14 moves the picture-taking lens 1 by the distance $\Delta d_a$ so that the picture-taking lens 1 can be separated from CCD2A, and the defocusing amount 1/W is found, and then judgment is conducted by the judgment section 15 and the position of the picture-taking lens 1 is controlled by the control section 16' as follows.

That is, when the defocusing amount 1/W is approximately zero, the focusing position is correct, so that the picture-taking lens 1 is set in the position. When the focusing position is not correct, the operation is conducted in order to set the picture-taking lens 1 in the correct focusing position in such a manner that: utilizing the defocusing amount 1/W in the condition before the picture-taking lens 1 is moved, lens movement amount $\Delta d_b$ corresponding to the other focusing point is found by equation (3)'; and the lens drive circuit 6 is driven to move the picture-taking lens 1 by the distance $\Delta d_a + |\Delta d_b|$ so that it can be approached to CCD2A.

According to the aforementioned system, if the focusing position calculated first is correct (the lens movement amount is $\Delta d$), it is not necessary to calculate further, so that a part of calculation can be omitted with the probability of 50%.

When the focusing position is not correct, the operation may be conducted in such a manner that: lens movement amount $\Delta d_b$ corresponding to a new focusing position is found according to the defocusing amount 1/W after the picture-taking lens 1 has been moved; and the picture-taking lens 1 is moved in the opposite direction by the distance $|\Delta d_b|$. When the lens movement amount calculated initially is not correct, this system is superior to the system in the aforementioned embodiment in which lens movement amount $\Delta d_a$ and $|\Delta d_b|$ are added to determine the movement amount of the opposite direction. On the other hand, this system can move the lens accurately because the defocusing amount 1/W which has been increased after lens movement is utilized and the lens movement amount can be determined by one operation.

In the aforementioned embodiment, the picture-taking lens is moved to one of the focusing positions. The system shown in FIG. 7 may be adopted. The elements shown by the number 1~12 are common between the system shown in FIG. 4 and that shown in FIG. 7, so that they are omitted in FIG. 7.

Figure 7:
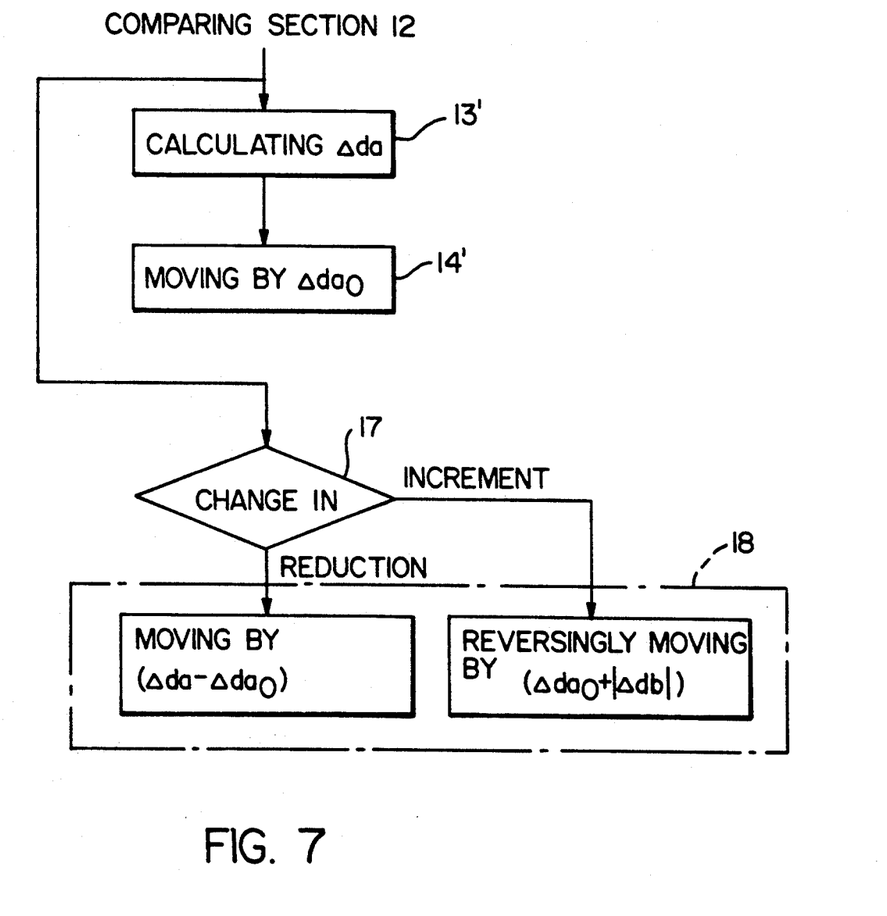
FIG. 7 is a view showing the composition of the third embodiment of the present invention.

In this system, the picture-taking lens 1 is moved in the direction of the focusing position by the distance $\Delta d_{ao}$ shorter than $\Delta d_a$ (which is calculated by the focusing position calculating section 13') which is the lens movement amount corresponding to one of the focusing positions. (The picture-taking lens 1 is moved by the picture-taking lens moving section 14'.)

The defocusing amount 1/W which is found in the position after movement, and the defocusing amount 1/W which was found in the position before movement, are compared by the judging section 17. When it is judged that the defocusing amount 1/W is decreased in the movement, it is judged that the focusing position is correct, and the picture-taking lens 1 is moved by the control section 18 in the same direction by the distance of ($\Delta d_a - \Delta d_{ao}$).

When the defocusing amount 1/W is increased, it is judged that the focusing position is not correct. In the same manner as the aforementioned embodiment, the lens movement amount $\Delta d_b$ in the reverse direction is found, utilizing the defocusing amount 1/W before the movement. Then, the picture-taking lens 1 is moved in the reverse direction by the distance of ($\Delta d_{ao} + |\Delta d_b|$). Otherwise, the lens movement amount $\Delta d_b$, which is the distance from the present position, is found, utilizing the defocusing amount 1/W after the movement, and the picture-taking lens 1 is moved by the distance of $|\Delta d_b|$. The aforementioned judging section 17 and control section 18 correspond to a position control means. In this case, accuracy of the latter is higher than that of the former. In the former case, $\Delta d_b$ may be previously found by the focusing position calculating section 13.

The initial movement amount $\Delta d_{ao}$ can be set in various manners as follows: it can be set according to a predetermined ratio (<1) of $\Delta d_a$; and a predetermined value is previously set, and when the setting value is higher than $\Delta d_a$, $\Delta d_{ao}$ is set according to a predetermined value (<1) of $\Delta d_a$, or $\Delta d_{ao}$ is set in such a manner that $\Delta d_{ao} = \Delta d_a$.

The system in which whether the focusing position is correct or not is judged according to increase and decrease in the defocusing amount 1/W before and after the movement of the picture-taking lens 1, can be applied to the system of the aforementioned embodiment in which the picture-taking lens is moved to one of the focusing positions initially. In the system in which whether the focusing position is correct or not is judged according to the changing state of the defocusing amount 1/W, when the picture-taking lens is located very close to the focusing position before movement, sometimes misjudgment is conducted. Even in the aforementioned case, the calculated movement amount is sufficiently small, so that even when the picture-taking lens is moved in the reverse direction, the focusing accuracy can be sufficiently ensured.

Since the lens movement amount $\Delta d$ also expresses the defocusing amount according to a deviation from the focusing position, whether the focusing position is correct or not can be judged in such a manner that: the lens movement amount $\Delta d_a$ in one direction which is calculated before the movement of the lens, and the lens movement amount $\Delta d_a'$ in the same direction which is calculated after the movement of the lens, are compared; and it can be judged that when $\Delta d_a' < \Delta d_a$, the assumed focusing position is correct, and when $\Delta d_a' > \Delta d_a$, the assumed focusing position is not correct. However, 1/W can be found previously, and the lens movement amount $\Delta d$ is found, utilizing the found 1/w, so that judgment is preferably conducted by 1/W as shown in the embodiment in order to reduce calculation time and improve accuracy.

Instead of moving the picture-taking lens, the image sensor may be moved. In this case, the image sensor movement amount $\Delta d$, wherein the direction in which the image sensor is separated from the picture-taking lens is defined as a positive direction, is found by the following equation, instead of equation (4). When equation (3) is utilized, $\Delta d$ becomes a positive value, and when equation (3)' is utilized, $\Delta d$ becomes a negative value.

$$1d_0 + 1/(d_1 + \Delta d) = 1/f \ldots \quad (4)'$$

In the aforementioned embodiment, the detection of the defocusing amount 1/W is conducted at the initial position of the picture-taking lens according to the equation obtained when one dimensional Z-transformation is conducted on the image signal data. However, the detection can be also conducted very accurately when the aforementioned two dimensional Z-transformation is performed.

The present invention can be applied to a telescope and the like as well as a camera.

EFFECT OF THE INVENTION

As explained above, according to the present invention, even when the picture-taking lens is located at an arbitrary position, focusing can be conducted by arithmetic processing in which data is taken in twice, and minimum movement of the picture-taking lens which is moved once or twice. Accordingly, the method of the present invention is suitable for high speed continuous photographing.

The operation does not rely on the kind of the photographic object, that is, the operation can be conducted without any relation to frequency components. Accordingly, accuracy is always high, and an optical system exclusive to automatic focusing is not necessary, so that the cost can be reduced.

What is claimed:

1. An apparatus for focusing an object through a lens on an image plane, comprising:
    an image sampling sensor for sampling a plurality of image data from an image of the object on said image plane;
    a processor for receiving said plurality of image data and for generating a Z-transformation polynomial in a given form by subjecting said plurality of image data to Z-transformation;
    a memory for storing a set of different focus-error distances each assigned a zero value making a Z-transformation polynomial of a corresponding focus-error distance a zero point;
    a focus-position computer for calculating said generated Z-transformation polynomial to obtain a calculation result for each different focus-error distance by inputting said assigned zero value of each of said different focus-error distances into the generated Z-transformation polynomial, for obtaining the absolute value of said calculation result for each of said different focus-error distances, for selecting an optimum focus-error distance to make said absolute value the smallest, and for obtaining a focusing point on the basis of said selected focus-error distance; and
    a lens position control for moving said lens to said focusing point.

2. The apparatus of claim 1,
    wherein said memory stores a plurality of zeros for each of said different focus-error distances, and
    wherein said focus position computer calculates said generated Z-transformation polynomial for each of said plurality of zeros, sums up said absolute values of said calculation results to obtain a sum of said absolute values for each of said different focus-error distances, and selects an optimum focus-error distance to make said sum the smallest.

3. The apparatus of claim 2, wherein said image sampling sensor samples said plurality of image data in a one dimensional sampling direction and said processor subjects said plurality of image data to one dimensional Z-transformation to generate a Z-transformation polynomial.

4. The apparatus of claim 3,
wherein said image sampling sensor carries out said one dimensional sampling plural times in a direction normal to said one dimensional sampling direction to obtain plural groups of said plurality of image data, said processor generates a Z-transformation polynomial for each of said plural groups and said focus position computer obtains plural sums corresponding to said plural groups for each of said different focus-error distances.

5. The apparatus of claim 4,
wherein said focus position computer selects an optimum focus-error distance to make said sum smallest.

6. The apparatus of claim 4,
wherein said focus position computer further totals said plural sums for each of said different focus-error distances, and selects an optimum focus-error distance to make said sum of said plural sums the smallest.

7. The apparatus of claim 2,
wherein said image sanding sensor samples said plurality of image data in a two dimensional sampling direction, said processor subjects said plurality of image data to two dimensional Z-transformation to generate a two dimensional Z-transformation polynomial, and said focus position computer calculates a Z-transformation polynomial obtained by one dimensional Z-transformation in terms of noise to obtain a zero and uses said zero of noise term as one of variables of said two dimensional Z-transformation polynomial.

8. The apparatus of claim 1,
wherein said image sampling sensor samples said plurality of image data when said lens is located at an infinite position, and said lens position control moves said lens to a focusing point in a direction toward to a closest focus position to focus a closest object.

9. The apparatus of claim 1,
wherein said image sampling sensor samples said plurality of image data when said lens is located at a closest focus position to focus a closest object, and said lens position control moves said lens to a focusing point in a direction toward to an infinite focus position to focus an object located at an infinite far position.

10. The apparatus of claim 1,
wherein said image sampling sensor samples said plurality of image data when said lens is located at an arbitrary position, and
wherein said focus position computer calculates one of a first focusing point located between said object and said lens and a second focusing point located between said lens and said image plane on the basis of said selected focus-error distance.

11. The apparatus of claim 10,
wherein said lens position control moves said lens to a point without passing over said calculated focusing point, and said focus position computer obtains a new focus-error distance when said lens is located at said point and determines a true focusing point from said new focus-error distance in addition to said previous focus-error distance.

12. The apparatus of claim 10,
wherein said lens position control moves said lens to said calculated focusing point, and said focus position computer obtains a new focus-error distance when said lens is located at said calculated focusing point and determines a true focusing point.

* * * * *